US012051333B2

(12) United States Patent
Rey et al.

(10) Patent No.: US 12,051,333 B2
(45) Date of Patent: Jul. 30, 2024

(54) AERIAL VEHICLE NETWORK TRAFFIC CONTROL

(71) Applicant: Skyryse, Inc., El Segundo, CA (US)

(72) Inventors: Gonzalo Javier Rey, Torrance, CA (US); Mark Groden, Marina Del Rey, CA (US)

(73) Assignee: Skyryse, Inc., El Segundo, CA (US)

(*) Notice: Subject to any disclaimer, the term of this patent is extended or adjusted under 35 U.S.C. 154(b) by 323 days.

(21) Appl. No.: 17/551,053

(22) Filed: Dec. 14, 2021

(65) Prior Publication Data

US 2022/0189314 A1 Jun. 16, 2022

Related U.S. Application Data

(60) Provisional application No. 63/125,884, filed on Dec. 15, 2020.

(51) Int. Cl.
*G08G 5/00* (2006.01)

(52) U.S. Cl.
CPC ......... *G08G 5/0013* (2013.01); *G08G 5/0026* (2013.01); *G08G 5/0039* (2013.01)

(58) Field of Classification Search
CPC .. G08G 5/0013; G08G 5/0026; G08G 5/0039; G08G 5/0052; G08G 5/006; G08G 5/0082; G08G 5/0091; G08G 5/025; G08G 5/0043
See application file for complete search history.

(56) References Cited

U.S. PATENT DOCUMENTS

| | | | | |
|---|---|---|---|---|
| 2016/0335898 | A1* | 11/2016 | Caplan | G08G 5/045 |
| 2018/0253979 | A1 | 9/2018 | Rey et al. | |
| 2019/0033861 | A1 | 1/2019 | Groden et al. | |
| 2019/0096269 | A1 | 3/2019 | Sidiropoulos | |
| 2022/0028279 | A1* | 1/2022 | Faccin | B64C 39/024 |

OTHER PUBLICATIONS

PCT International Search Report and Written Opinion, PCT Application No. PCT/US2021/63388, Feb. 25, 2022, 13 pages.

* cited by examiner

*Primary Examiner* — Shon G Foley
(74) *Attorney, Agent, or Firm* — Fenwick & West LLP

(57) ABSTRACT

Controlling aircraft traffic in an aerial network is described. A controller system identifies a departure site, an arrival site, a departure time interval, and an arrival time interval. Based on the on the departure site, the arrival site, and the departure time interval, the controller system generates a spatiotemporal region. A spatiotemporal region defines a three-dimensional perimeter that moves in time along a flightpath from the departure site to the arrival site. An aircraft is assigned to the spatiotemporal region and instructed to remain within perimeter of the spatiotemporal region as the aircraft travels from the departure site to the arrival site. The controller system monitors locations of the aircraft over time relative to the perimeter of the spatiotemporal region. If the aircraft deviates from the spatiotemporal region, the controller may transmit control instructions to the aircraft to return to the spatiotemporal region.

20 Claims, 8 Drawing Sheets

AERIAL VEHICLE NETWORK TRAFFIC CONTROL

CROSS REFERENCE TO RELATED APPLICATIONS

This application claims the benefit of U.S. Provisional Application No. 63/125,884, filed on Dec. 15, 2020, the content of which is incorporated by reference herein in its entirety.

TECHNICAL FIELD

The disclosure generally relates to the aviation field, and particularly to controlling aircraft traffic in an aerial network via spatiotemporal regions.

BACKGROUND

Air traffic control is not automated today. Instead, air traffic is controlled by people, for example, to coordinate aircraft and avoid collisions. Additionally, an air mobility network in a dense network, such as an urban area, may entail several orders of magnitude more traffic control actions than are currently made by conventional air traffic controllers. Thus, air traffic control in dense networks is difficult or not currently feasible.

Figure 1:
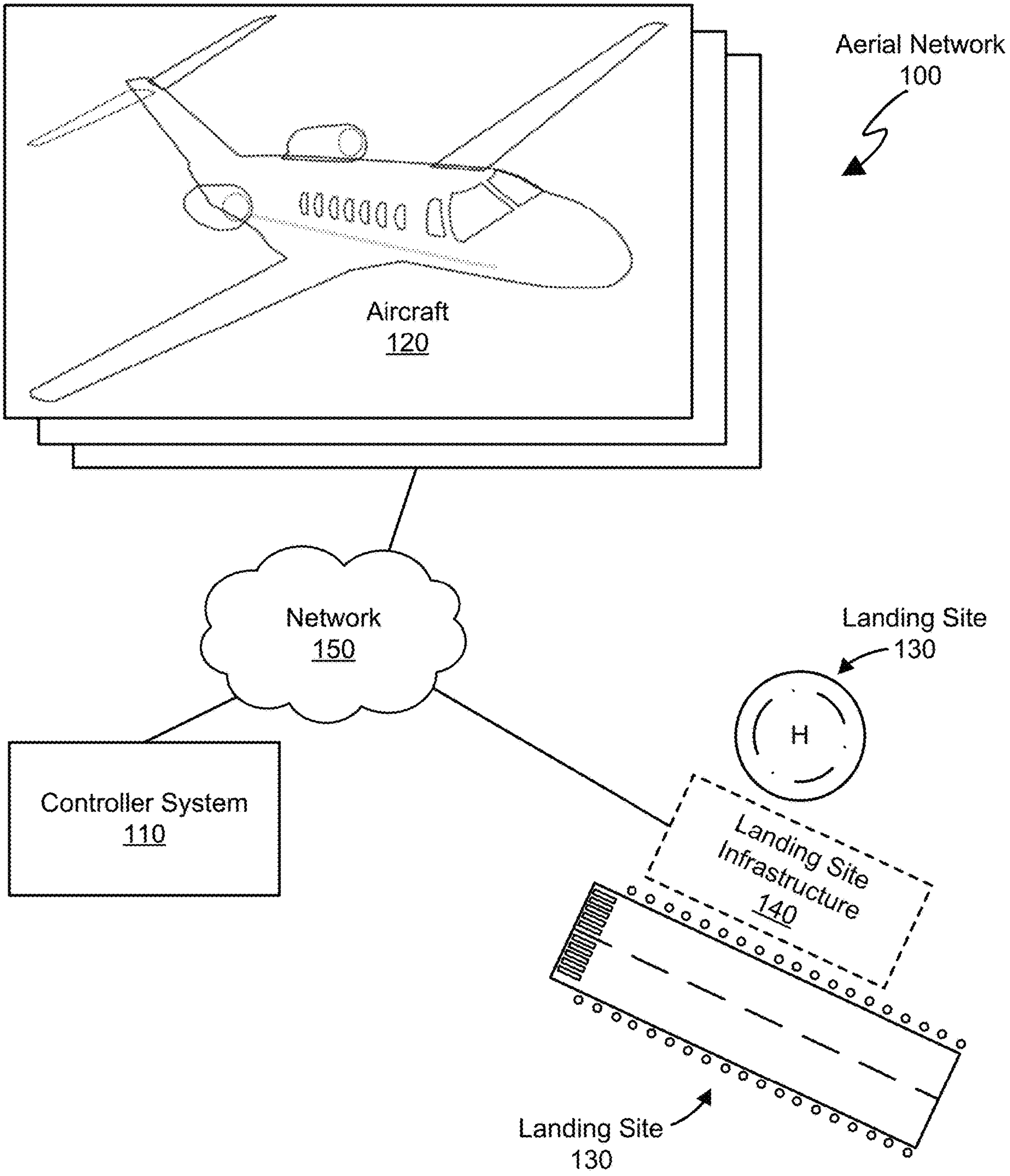
FIG. 1 illustrates an example aerial network according to one or more embodiments.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

The Figures (FIGS.) and the following description relate to preferred embodiments by way of illustration only. It should be noted that from the following discussion, alternative embodiments of the structures and methods disclosed herein will be readily recognized as viable alternatives that may be employed without departing from the principles of what is claimed.

Reference will now be made in detail to several embodiments, examples of which are illustrated in the accompanying figures. It is noted that wherever practicable similar or like reference numbers may be used in the figures and may indicate similar or like functionality. The figures depict embodiments of the disclosed system (or method) for purposes of illustration only. One skilled in the art will readily recognize from the following description that alternative embodiments of the structures and methods illustrated herein may be employed without departing from the principles described herein.

Embodiments relate to a system, method, and non-transitory computer readable storage medium for controlling aircraft traffic in an aerial network. This allows air traffic control to be automated and scalable (e.g., in dense urban areas). Embodiments may include a controller system that identifies a departure site, an arrival site, a departure time interval, and an arrival time interval. Based on the on the departure site, the arrival site, and the departure time interval, the controller system generates a spatiotemporal region. A spatiotemporal region defines a three-dimensional perimeter that moves in time along a flightpath from the departure site to the arrival site. An aircraft is assigned to the spatiotemporal region and instructed to remain within the perimeter of the spatiotemporal region as the aircraft travels from the departure site to the arrival site. The controller system monitors locations of the aircraft over time relative to the perimeter of the spatiotemporal region. If the aircraft deviates from the perimeter of the spatiotemporal region, the controller may transmit control instructions to the aircraft to return to the spatiotemporal region.

An example distinguishing characteristic of an aerial network in a dense urban environment may be the high utilization of landing sites, such as airports and helipads. Thus, it may be advantageous for these landing sites to be tightly controlled to coordinate with ground operations (e.g., passengers and cargo arriving and departing from landing sites). Among other advantages, embodiments may enable this coordination by controlling the arrival and departure time slots of the landing sites. Additionally, embodiments may increase (e.g., maximize) the utilization of these landing sites so that the aerial network can operate in an urban environment.

Spatiotemporal regions provide may advantages, several of which are described below. Spatiotemporal regions may increase the operational efficiency and density of urban air transportation by restricting (e.g., all) aircraft within the network to fly within the spatiotemporal regions. This may reduce or eliminate the need for dynamic flight plan adjustments after takeoff. Additionally, spatiotemporal regions may reduce or eliminate delays in air transportation by pre-authorizing a complete flightpath (e.g., takeoff, cruise, and landing). Managing traffic flow throughout the aerial network may ensure that a landing site will be available at the destination upon arrival (and thus reducing or eliminating the use of holding patterns). Reducing holding patterns proximal to a destination mitigates air traffic congestion and noise disturbances, which may be important in urban areas. The controller system may also ensure landing site availability by limiting departures from each landing site within the aerial network to quantized time intervals.

Due to the spatiotemporal regions, the spacing between aircraft may be tighter than the typical separation in aerial networks controlled by conventional air traffic control. For example, conventional networks may limit aircraft from being within two minutes of flight time of each other. In another example, conventional networks may limit aircraft from being with six miles of each other when on approach to a runway. However, in an urban mobility setting, these distances may be about the distance between landing sites. Thus, the spatiotemporal regions may enable air traffic control in urban settings by allowing aircraft to fly closer together.

Spatiotemporal regions may also reduce the sensitivity of air traffic networks to weather influence and flight delay propagation. For example, the departure time intervals (and the arrival time intervals) may include buffer times. Additionally, a threshold number of spatiotemporal regions may remain unassigned so that aircraft in the network can be dynamically reassigning to other spatiotemporal regions. Thus, spatiotemporal regions may increase the predictability of aircraft departure and arrival times, which may enable urban air transportation to be integrated with other ground-based service platforms (e.g., ridesharing, buses, and trains).

Spatiotemporal regions also help enforce adequate spacing between aircraft so they comply with flight restrictions and regulations. As previously discussed, as the density of aircraft in an airspace increases, conventional traffic control systems may be error prone. Instead, spatiotemporal regions constrain the aircraft to predetermined perimeters moving along predetermined flightpath routes, which can be pre-established in compliance with regulatory restrictions. This may thus eliminate or reduce the need to regularly resolve dynamic air traffic constraints.

Example Aerial Network

FIG. 1 illustrates an example aerial network 100, according to one or more embodiments. The aerial network 100 includes a controller 110, one or more aircraft 120, multiple landing sites 130, landing site infrastructure 140, and a network 150. The controller 110 communicates (via network 150) with the aircraft 120 and landing site infrastructure 140 to facilitate flights between the landing sites 130. The aerial network 100 can include different components than those illustrated. Although the description herein refers to an aerial network, embodiments may be relevant to any network with limited hub capacity. For example, embodiments may be relevant to land vehicles operating in a ground network.

An aircraft 120 (also referred to as an aerial vehicle) is a vehicle that operates in the aerial network 100 and travels between landing sites 130. An aircraft 120 can transport cargo (e.g., passengers) between landing sites 130. Example aircraft 120 include: manned aircraft, unmanned aircraft (UAV), rotorcraft, and fixed wing aircraft. An aircraft 120 may be a fly-by-wire (FBW) aircraft or an aircraft which relies on conventional manual flight controls.

The aircraft 120 may operate autonomously, semi-autonomously (e.g., by an autopilot or guidance and navigation system aided by a human operator), or manually. An aircraft 120 may be earth referenced (e.g., relative to the ground or waypoints), but can be referenced relative to a target (e.g., landing sites) or flightpath. Controlling an aircraft may include controlling the speed, direction of motion, position, orientation, attitude, and pose of the aircraft.

An aircraft 120 may be associated with a unique aircraft identifier, which is stored in a database (e.g., cloud server or local server) and accessed by the controller 110. The aircraft identifier may be stored in response to registration of the aircraft 120 within the aerial network 100. Additionally, or alternatively, the aircraft identifier may be accessed from a database, such as a public database not managed by the controller 110. The identifiers may be tail numbers of the aircraft 120, such as aircraft registration numbers (e.g., for civil aircraft) or military aircraft serial numbers (e.g., for military aircraft).

The landing sites 130 are locations where aircraft 120 can takeoff or land. Example landing sites 130 include helipads, runways, and airstrips. Landing sites 130 within the aerial network 100 may be private or public. A landing site 130 may be uniquely identified with an identifier, which can be stored in a landing site database (e.g., of the controller 110). A landing site may be certified by the FAA or other certification agency. Approach and departure paths for each landing site 130 may be publicly available. Approach and departure paths may be stored in a landing site database in conjunction with the landing site identifier. Depending on the context, landing sites 130 may be referred to as "departure sites" or "arrival sites."

Landing site infrastructure 140 monitors a landing site 130 (or multiple sites 130) within the aerial network 100 and may determine a status of the landing site 130. The status of a landing site 130 is indicative of its current availability to receive an aircraft 120 (e.g., allow an aircraft 130 to land or allow an aircraft to use the site 130 to takeoff). However, the status of a landing site 130 can additionally or alternatively include weather data (e.g., current wind speed or direction, temperature, humidity, occurrence of precipitation), availability of approach and departure paths, or the presence of obstructions (e.g., human presence). Landing site infrastructure 140 may include cameras, weather stations, proximity sensors, radar sensors, or temperature sensors.

The controller system 110 (also referred to as a controller) manages aircraft scheduling and routing between landing sites 130. The controller 120 can be local to the aircraft 120, remote from the aircraft 120, or otherwise located. The controller 120 may receive information from aircraft 120 (e.g., assignment requests, location information, and sensor data) and landing site infrastructure (e.g., weather data and landing site status) within the aerial network 100. The controller 110 is further described with respect to FIG. 2.

The controller 110, aircraft 120, and landing site infrastructure 140 are configured to communicate via the network 150, which may comprise any combination of local area and wide area networks, using both wired and wireless communication systems. In one embodiment, the network 150 uses standard communications technologies and protocols. For example, the network 150 includes communication links using technologies such as satellite communication, radio, vehicle-to-infrastructure ("V2I") communication technology, Ethernet, 802.11, worldwide interoperability for microwave access (WiMAX), 3G, 4G, code division multiple access (CDMA), digital subscriber line (DSL), etc. Examples of networking protocols used for communicating via the network 150 include multiprotocol label switching (MPLS), transmission control protocol/Internet protocol (TCP/IP), hypertext transport protocol (HTTP), simple mail transfer protocol (SMTP), and file transfer protocol (FTP). Data exchanged over the network 150 may be represented using any suitable format, such as hypertext markup language (HTML) or extensible markup language (XML). In some embodiments, all or some of the communication links of the network 150 may be encrypted using any suitable technique or techniques.

Figure 2:
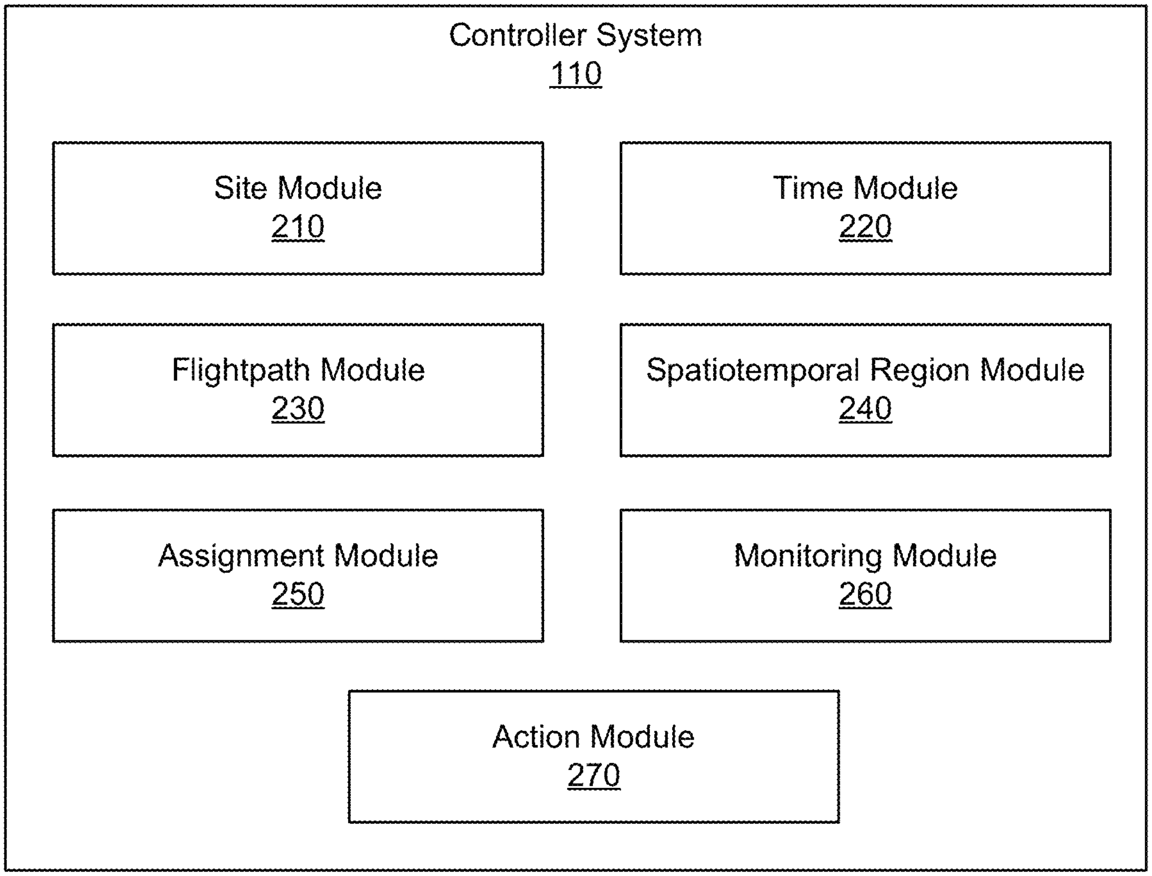
FIG. 2 illustrates a block diagram of an example controller system according to one or more embodiments.

FIG. 2 is a block diagram of an example controller system 110, according to one or more embodiments. The controller system 110 includes a site module 210, a time module 220, a flightpath module 230, a spatiotemporal region module 240, an assignment module 250, a monitoring module 260, and an action module 270. The controller system 110 can include different modules than those illustrated.

As described above, the controller 110 controls traffic in the aerial network 100 by generating one or more spatiotemporal regions, assigning aircraft to the spatiotemporal regions, and monitoring locations of the aircraft over time relative to the spatiotemporal regions. The controller 110 may also perform corrective actions if an aircraft strays from a spatiotemporal region. These functions are further described below with respect to the modules.

The site module 210 identifies a departure site and an arrival site. A departure site is a landing site that an aircraft is expected to use to takeoff. An arrival site is a landing site 130 that an aircraft is expected to use to land. The sites may be selected from a set of landing sites in the aerial network. The sites may be used by the controller 110 to generate a spatiotemporal region. Thus, an aircraft assigned to a spatiotemporal region may leave from the departure site, travel along a flightpath, and arrive at the arrival site. The departure site and the arrival site may be different or the same landing site (e.g., for a guided flight tour).

The sites may be identified based on their locations, destinations near the landing sites, current demand (e.g., a threshold number of people want to travel from the departure site to the arrival site), predicted demand (e.g., a threshold number of people will want to travel from the departure site to the arrival site). The sites may be identified based on the number of aircraft 120 that have previously traveled from the departure site to the arrival site (e.g., based on historical flight records).

The time module 220 determines time intervals for landing sites in the aerial network. A landing site time interval specifies a time period for an aircraft to occupy a landing site (e.g., to takeoff or land). This may prevent a landing site from being used by multiple aircraft at once. Said differently, determining time intervals helps ensure that the number of aircrafts landing and departing from landing sites does not exceed the capacity of the landing sites. Time intervals may also passively or pre-emptively deconflict aircraft. A time interval determined for a departure site may be referred to as a "departure time interval," and a time interval determined for an arrival site may be referred to as an "arrival time interval."

A time interval may also include time for the aircraft 130 to arrive at the landing site 130 from a nearby location or surrounding airspace (e.g., within a threshold altitude or within threshold distance of the site). A time interval may not only include time to leave a landing site 130 but also time leave a nearby location or surrounding airspace. For example, if a helicopter is expected to land at an arrival site, the arrival time interval may include time for the helicopter to enter airspace surrounding the arrival site, land at the arrival site, perform ground operations at the arrival site (e.g., exchange cargo or passengers), takeoff from the arrival site, and leave the surrounding airspace. In another example, if an airplane is expected to takeoff from a departure site, the departure time interval may include time for the airplane to leave a nearby location (e.g., hangar or airport terminal), arrive at the departure site, takeoff from the departure site, and leave the surrounding airspace.

The time interval may also include buffer time (also referred to as a "reserve capacity") to account for possible delays. The buffer time may be a multiple of the time required for an arrival and departure sequence at a landing site. The buffer time may alternatively be a fixed offset. The buffer time may be predetermined, such as based on a variance in arrival and departure sequences at a landing site.

A time interval may be specific to a landing site. For example, due to local weather conditions or the layout, aircraft may need more time to occupy a first landing site compared to a second landing site. In some embodiments, an interval for a landing site may be based on a time interval for another landing site. For example, if a first landing site requires long time intervals comparted to other landing sites, time intervals for the other landing sites may be similar to the long time intervals to reduce traffic congestion around the first landing site. Other factors may affect a time interval, such as the expected aircraft type, time of day, time of year, historical data, published certification data for the landing site, the set of flightpaths within the aerial network leading to and from the site, relative demand, type of cargo (e.g., human passengers or delivery parcels), or an arrival and departure schedule for the site.

Time intervals may be dynamically or preemptively adjusted, for example, in response to emergency scenarios or during dynamic rerouting. For example, due to severe weather, a time interval is adjusted. Adjusting a time interval may include changing the total time duration of the interval, changing the start time, or changing the end time. Time intervals may be adjusted by the action module 270, which is further described below.

The flightpath module 230 determines a flightpath for an aircraft to travel from a departure site to an arrival site. A flightpath may depend on the time intervals determined by the time module 220, an expected type of aircraft that will travel along the path (e.g., speed and flight capabilities of the expected type of aircraft), or the current or expected weather between the departure site and the arrive site. A flightpath may be dynamically or preemptively adjusted, for example, by the action module 270, which is further described below. In some embodiments, the flightpath module 230 determines multiple flight paths between a first landing site (e.g., a departure site) and a second landing site (e.g., an arrival site). In some embodiments, a flight path includes a take off flight path for a departure site, a landing flight path for an arrival site, and an intermediate flight path that connects the take off flight path to the arrival flight path. A flight path may be determined based on a minimum height threshold, based on the presence of obstacles (e.g., buildings, mountains, etc.), based on a ground noise threshold, based on weather patterns, based on regulatory restrictions (e.g., no-fly zones, within pre-established flight corridor), and/or any other suitable restrictions, based on existing flightpaths, based on a path-length minimization, or based on aircraft class maneuverability restrictions (e.g., minimum turning radius, maximum angle of attack/descent, etc.).

The spatiotemporal region module 240 generates a spatiotemporal region (also refer to as a "spatiotemporal bubble"). A spatiotemporal region defines a three-dimensional virtual perimeter that moves in time along a flightpath from a departure site to an arrival site. For example, the region module 240 generates time correlated perimeter positions so that a perimeter is initially positioned at the departure site (e.g., during the departure time interval), moves along the flightpath over time, and is terminally positioned at the arrival site (e.g., during the arrival time interval).

An aircraft assigned to a spatiotemporal region is expected to stay within the perimeter of a spatiotemporal region as it travels from a departure site to an arrival site. Thus, the perimeter may enclose a volume large enough to contain an aircraft. The volume may also be large enough for an aircraft to move within the perimeter. For example, the volume is large enough for the pilot to make (e.g., minor) position adjustments without leaving the perimeter. In some embodiments, the volume is large enough to accommodate tracking errors of the aircraft. The temporal component of a spatiotemporal region may be defined by a set of time steps in a timeseries. At each time step, the perimeter may be positioned at a point along the flightpath. Spatiotemporal regions can be visualized as a three-dimensional volume moving in a time dimension (e.g., a four-dimensional geofence).

Figure 3:
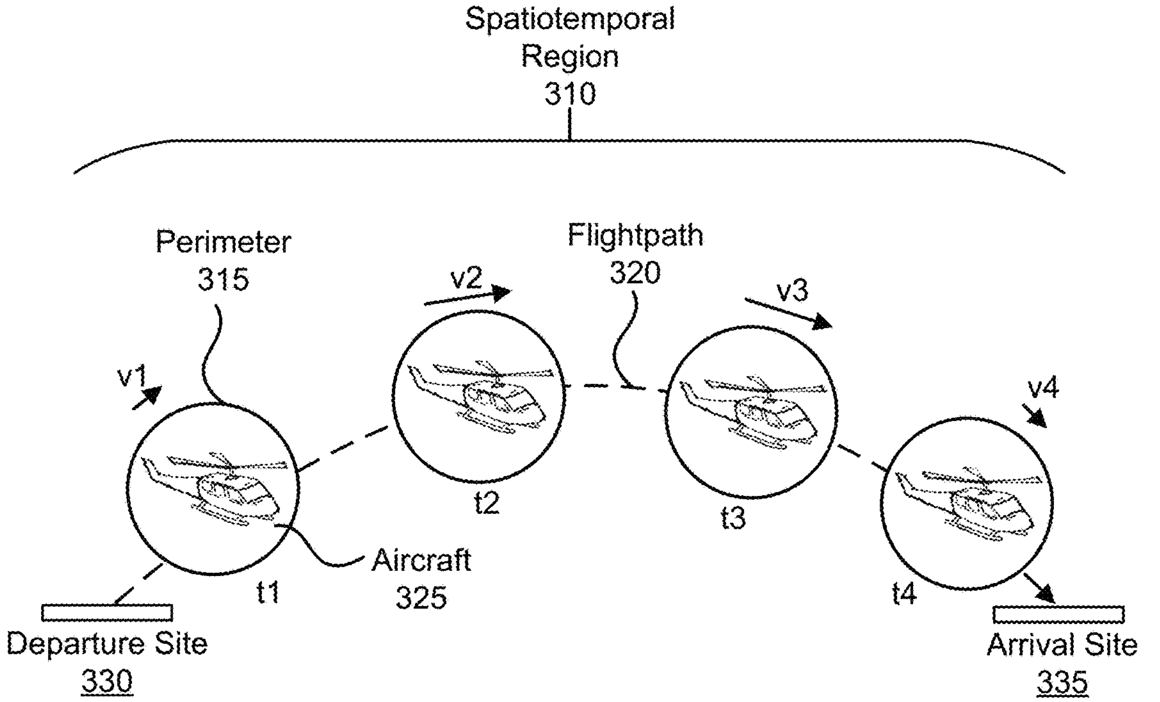
FIG. 3 illustrates an example spatiotemporal region according to one or more embodiments.

FIG. 3 illustrates an example spatiotemporal region 310, according to one or more embodiments. Specifically, FIG. 3 illustrates a perimeter 315 of the spatiotemporal region 310 at four points in time (labeled t1-t4). The perimeter 315 travels along a flightpath 320 from a departure site 330 to an arrival site 335. At each point in time, the perimeter 315 is associated with a respective velocity (labeled v1-v4). An aircraft 325 (in this case, a helicopter) is assigned to the spatiotemporal region 310, and the aircraft 325 flies from the departure site 330 to the arrival site 335 by staying within the perimeter 315. Although not illustrated, the spatiotemporal region 310 may originate at the departure site (e.g., before time t1) and terminate at the arrival site (e.g., after time t4).

Referring back to FIG. 2, the origination time of a perimeter and the time when the perimeter departs the departure site ("spatiotemporal region departure time") may both be based on the departure time interval. Similarly, the time when the perimeter arrives at the arrival site ("spatiotemporal region arrival time") and the termination time of a perimeter and may both be based on the arrival time interval. For example, a spatiotemporal region originates at the departure site at the start of the departure time interval, begins moving along the flightpath at the end of the departure time interval, arrives at the arrival site at the start of the arrival time interval, and terminates at the end of the arrival time interval.

Since it may be difficult to predict the exact time that an aircraft physically leaves a departure site, the spatiotemporal region departure time may be different than the time an assigned aircraft leaves the landing site. In these cases, the location of the perimeter may be shifted in time (e.g., forward or backward) to coincide with the location of the aircraft after takeoff. Additionally, or alternatively, the aircraft may be instructed to slow down or speed up to reach the perimeter. Similar shifting may occur when the aircraft arrives at an arrival site. These shifting actions may be performed by the action module 270. In addition to, or alternative to, perimeter shifting, the size of a perimeter may be larger during the takeoff and landing times so that the aircraft can stay within the perimeter even if the takeoff and landing times are unknown or likely to change.

The spatiotemporal region module 240 may generate a perimeter shape and size for the spatiotemporal region (e.g., for each timestep). During the duration of the spatiotemporal region, the perimeter may have a fixed size or a variable size. For example, the size of a perimeter may decrease when it is near specific geographic locations (e.g., near an urban population, a landing site, or another aircraft). The shape of a perimeter may similarly be fixed or variable over time. Example perimeter shapes include spheres, prolate ellipsoids, ovaloid, and prisms.

A perimeter size and shape may be determined according to an aircraft class for an aircraft that is expected to be assigned to the spatiotemporal region. An aircraft class may specify the tracking ability and takeoff and landing abilities of an aircraft. For example, an aircraft 20 m long and capable of tracking its position within 40 m may operate within a perimeter with a dimension of 50 m. In another example, the perimeter size and shape are different for a two-person helicopter compared to a 100-passenger airliner. Other factors may include the landing site type (e.g., helipad vs airstrip) at one or both endpoints of the flightpath, landing site size at one or both endpoints, cargo requirements, and the time intervals.

The speed of a perimeter moving along a flightpath is referred to as the flightpath rate. The flightpath rate may move along a flightpath at a uniform or variable rate. For example, the rate is different for descending, ascending, and constant altitude segments of the flightpath. The flightpath rate may be predetermined (e.g., based on flight scheduling) or dynamically determined (e.g., in response to slowdowns or delays). The flightpath rate may be determined based on an aircraft class for an aircraft that is expected to be assigned to the spatiotemporal region, based on the landing site type at one or both endpoints of the flightpath, based on proximity to urban population centers, based on proximity to obstacles, based on the curvature of a flightpath segment (different aircraft have different turning radii), based on the departure time interval, based on the arrival time interval.

The spatiotemporal region module 240 may also determine deviation thresholds for a spatiotemporal region. A deviation threshold defines allowable deviations of the aircraft outside of the perimeter. A deviation threshold may define a distance outside of the perimeter, a time interval outside of the perimeter, or a combination of both. For example, if the distance of an aircraft from the perimeter exceeds a threshold distance, the aircraft may be instructed to return to the perimeter (described further with respect to the action module 270). In another example, if the aircraft is outside of the perimeter longer than a threshold time, the aircraft may be instructed to return to the perimeter. A deviation threshold may change based on the time or location of the perimeter. A deviation threshold may be based on the size or shape of the perimeter, proximity to other aircraft or spatiotemporal regions, proximity to landing sites, aircraft parameters (e.g., class, weight, turning radius, or type of aircraft), altitude, proximity to urban population centers, proximity to other flightpaths, a landing site type, or cargo requirements. For example, since takeoff and landing times of the aircraft may be uncertain or likely to change, the deviation parameters may increase when the perimeter is near a landing site (e.g., within a threshold distance).

The spatiotemporal region module 240 may generate multiple spatiotemporal regions for a flightpath. The spatiotemporal regions may be consecutive or sequential and they may exist simultaneously or concurrently. Perimeters may be adjacent or separated by a predetermined time interval or distance (e.g., to reduce or prevent collisions). The spacing may change over time and is based on, for example, a clearance distance specified by flight regulations or the position, velocity, and size of the perimeters. For example, multiple spatiotemporal regions are generated along a flightpath so that aircraft inside the perimeters respect landing site timing restrictions (e.g., minimum 5-minute cargo transition) and local flight ordinances (e.g., minimum separation distance of 500 meters).

Figure 4:
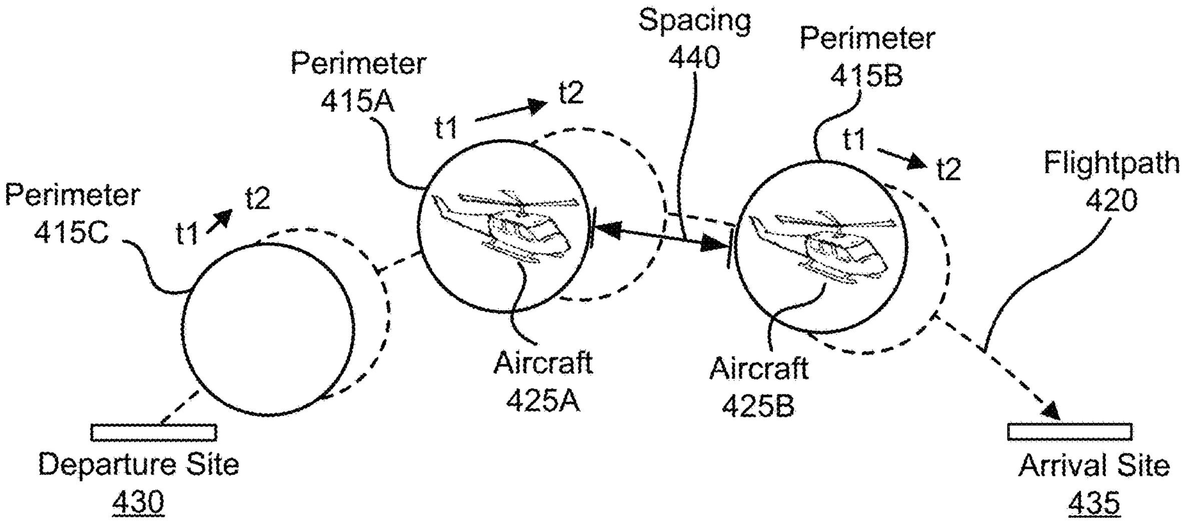
FIG. 4 illustrates multiple example spatiotemporal regions on a flightpath according to one or more embodiments.

FIG. 4 illustrates multiple example spatiotemporal regions for a single flightpath 420, according to one or more embodiments. Specifically, FIG. 4 illustrates three perimeters 415A-415C (each associated with a different spatiotemporal region) that travel along the same flightpath 420 from departure site 430 to arrival site 435. Each perimeter 415 is illustrated at two points in time (labeled t1 and t2). The perimeters 415 are spaced apart from one another (e.g., to avoid collisions). Spacing 440 indicates the distance between perimeter 415A and perimeter 415B at time t1. Aircraft 425A is assigned to perimeter 415A and aircraft 425B is assigned to perimeter 415B. No aircraft is assigned to perimeter 415C.

Figure 5:
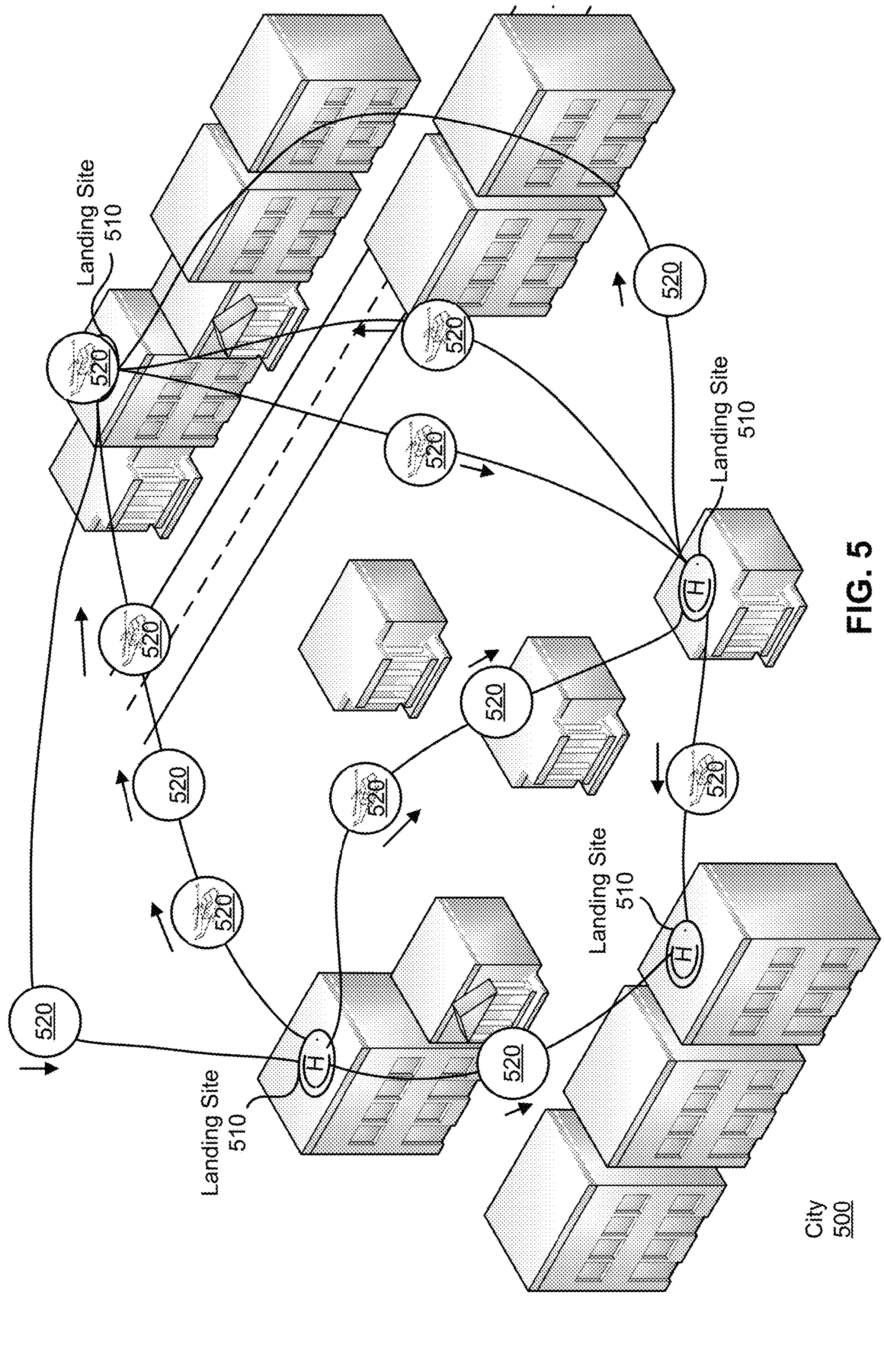
FIG. 5 illustrates example spatiotemporal regions for landing sites located throughout a dense urban city according to one or more embodiments.

The spatiotemporal region module 240 can also generate spatiotemporal regions for multiple flightpaths (e.g., see FIG. 5). FIG. 5 illustrates example spatiotemporal regions for landing sites 510 located throughout a dense urban city 500, according to one or more embodiments. The arrows indicate the direction of travel of the perimeters 520. FIG. 5 includes assigned and unassigned perimeters 520 (indicated by the presence (or lack) of a helicopter. Intentionally generating unassigned spatiotemporal regions is described with respect to the assignment module 250.

Determining multiple spatiotemporal regions establishes a schedule of airspace regions within the aerial network. The spatiotemporal regions can be established between any two landing sites of the aerial network which are accessible along aerial corridors. The spatiotemporal region module 240 may generate spatiotemporal regions such that aircraft are regularly traveling along established flightpaths. In some embodiments, spatiotemporal regions are generated such that perimeters are departing and arriving regularly. For example, perimeters depart from a departure site periodically, where the period is equal to a time interval of the departure site (or an integer number of the time interval). This may allow cargo (e.g., passengers) to move between landing sites consistently and regularly.

Figure 9:
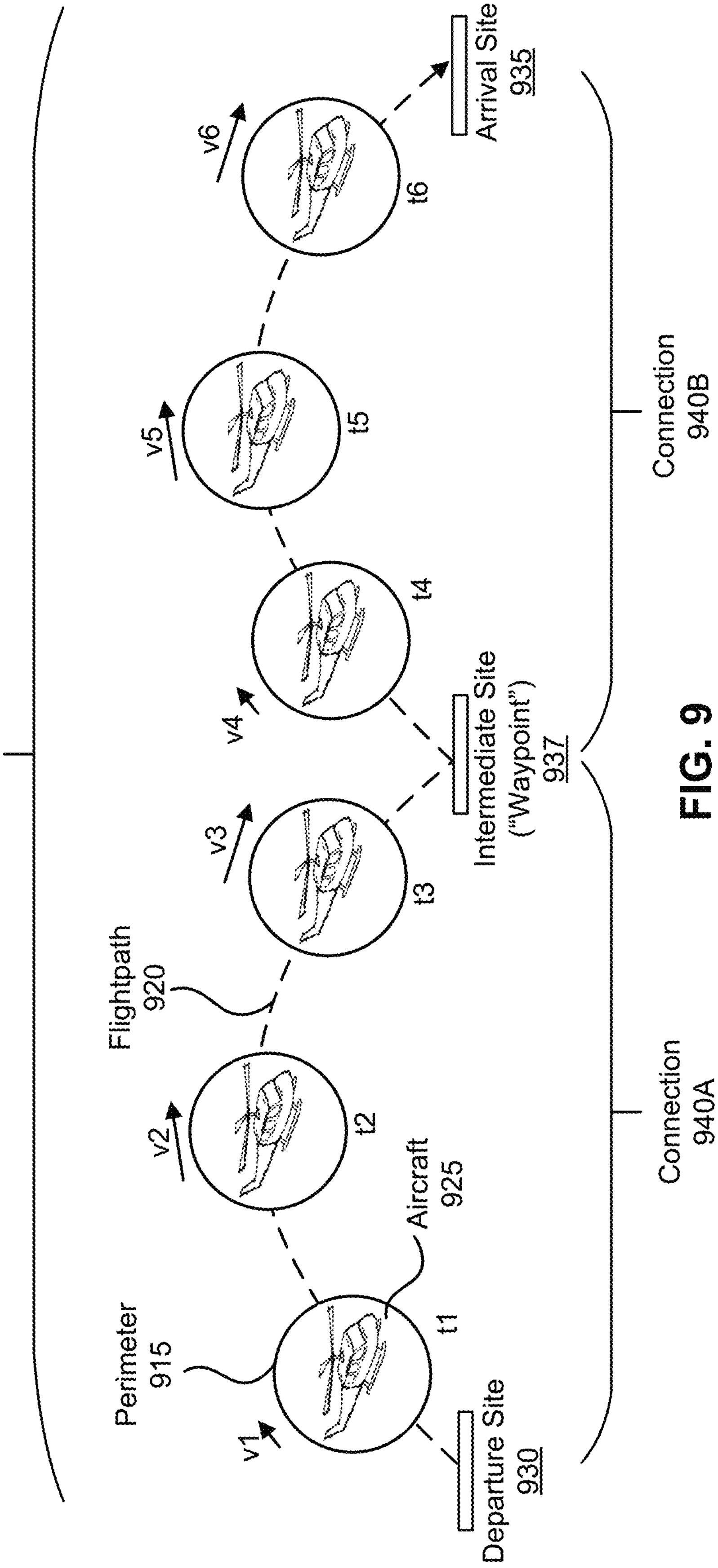
FIG. 9 illustrates an example spatiotemporal region with an intermediate site, according to one or more embodiments.

In some embodiments, the spatiotemporal region module 240 generates a spatiotemporal region with an intermediate site (also referred to as a waypoint). FIG. 9 illustrates an example spatiotemporal region 910 with an intermediate site 937, according to one or more embodiments. Specifically, FIG. 9 illustrates a perimeter 915 of the spatiotemporal region 910 at six points in time (labeled t1-t6). The perimeter 915 travels along a flightpath 920 from a departure site 330 to the intermediate site 937 and from the intermediate site 937 to an arrival site 335. Although only one intermediate site 937 is illustrated, a spatiotemporal region may include additional intermediate sites. At each point in time, the perimeter 915 is associated with a respective velocity (labeled v1-v6). An aircraft 925 (in this case, a helicopter) is assigned to the spatiotemporal region 910, and the aircraft 925 flies from the departure site 930 to the arrival site 935 while stopping at the intermediate site 937. The portion of the flight path 920 from the departure site 930 to the intermediate site 937 is the connection 940A, and the portion of the flight path 920 from the intermediate site 937 to an arrival site 935 is connection 940B.

Connections can be determined according to any suitable goals, rules, or optimization parameters. In variants, connections within the aerial network can be determined based on a historical demand for travel between two regions, historical traffic patterns, or based on a path length minimization. Connections can be determined using a combinatorial optimization, network diagrams, or heuristics (e.g., metaheuristics).

After a departure time for a particular departure site has been determined, time intervals for one or more waypoints along the flightpath can be determined. For example, a time to traverse from the departure site to the waypoint may be determined according to the flightpath rate. The traversal time may then be used to determine an arrival time for the waypoint.

In a specific example, for departure time t, a flightpath defined by waypoints uniformly spaced along the flightpath (a path length L between consecutive waypoints along the flightpath), and a uniform rate of traverse X (where X/L=T; where T is the time interval between consecutive waypoints along the flightpath), the times assigned to waypoints (e.g., beginning with the departure landing site) may be taken as: t; t+T; t+2T; t+3T; . . . ; t+nT (e.g., for the $n^{th}$ waypoint).

In variants, the rate of traverse of the spatiotemporal regions along each connection is numerically offset by a predetermined threshold based on the interval of the waypoints. In a specific example, for periodic interval (I), a rate of traverse for a first connection yields a flight duration (T) and a rate of traverse for a second connection yields a second flight duration which is offset by a multiple of I (e.g., T-NI—where N is a natural number; T-2I, etc.).

Referring back to FIG. 2, the assignment module 250 assigns aircraft to spatiotemporal regions. For example, the assignment module 250 assigns each available aircraft to an unassigned spatiotemporal region. An assignment may authorize an aircraft to operate within a spatiotemporal region. Among other advantages, assigning aircraft to spatiotemporal regions deconflicts aircraft within the aerial network.

In some embodiments, after an aircraft is assigned to a spatiotemporal region, the aircraft controller (e.g., pilot) is limited to operating the aircraft within the perimeter of the spatiotemporal region. Said differently, aircraft maneuverability and control authority may be constrained by the perimeter of the spatiotemporal region. In some cases, exiting the spatiotemporal region requires a user confirmation to override a control boundary.

An aircraft may be selected for assignment because it can meet the requirements of the spatiotemporal region (e.g., it can reach the departure site by the departure time interval, traverse the flightpath, and reach the arrival site by the arrival time interval). In another example, the assignment module 250 automatically assigns an aircraft based on a standing reservation (e.g., periodic assignment request for a spatiotemporal region along a particular flightpath).

Each generated spatiotemporal region may be matched with an aircraft. However, in some cases, one or more spatiotemporal regions are not assigned to an aircraft. For example, there may be more spatiotemporal regions than available aircraft. In another example, a threshold percentage or number of spatiotemporal regions are intentionally unassigned as reserve capacity. This may allow quick rerouting of an aircraft (if needed) and may thus reduce delay propagation throughout the network.

In some embodiments, after an aircraft is assigned to a spatiotemporal region, the controller 110 modifies the spatiotemporal region based on the aircraft. For example, the controller 110 modifies a size or shape of the perimeter based on the assigned aircraft. This may ensure the perimeter encloses a volume large enough for the aircraft to operate in. Additionally, or alternatively, the controller 110 may modify the flightpath based on the assigned aircraft. For example, the assigned aircraft may have a turning radius too large for the current flightpath. In some embodiments, the controller 110 modifies the flightpath rate of the perimeter based on the assigned aircraft. For example, the assigned aircraft may have a faster acceleration than that flightpath rate of the perimeter. In some embodiments, the modification is based on the ability of the aircraft to accurately control its trajectory (e.g., ground track and altitude) and timing. This ability may be related to the performance capabilities of the aircraft's control system and who or what is flying the aircraft. For example, a human pilot flying by hand may be less accurate at staying on a flight path than an autopilot system. Thus, if an aircraft does not have automated flight capabilities, the controller 110 may increase the size of the perimeter.

As previously described, the controller 110 may generate a multitude of spatiotemporal regions (e.g., to provide extra network flexibility). Some of these spatiotemporal regions may conflict (e.g., they have overlapping departure time intervals, arrival time intervals, or flightpaths). In these cases, after an aircraft is assigned to a spatiotemporal region, the controller 110 may modify spatiotemporal regions that conflict with the assigned spatiotemporal region (so that the regions no longer conflict). Additionally, or alternatively, the controller 110 may delete one or more conflicting spatiotemporal regions. In some embodiments, conflicting spatiotemporal regions are assigned to the aircraft or designated as unassignable to prevent other aircraft from being assigned to those spatiotemporal regions. For example, all spatiotemporal regions that connect two landing sites and share the same time intervals (but may have different flightpaths) are assigned to a single aircraft. This may allow the aircraft to change spatiotemporal regions as it travels to an arrival site.

The assignment may include instructions for the aircraft to remain within the spatiotemporal region as the aerial vehicle travels from the departure site to the arrival site. For example, the spatiotemporal region is displayed to the pilot (e.g., via a head-mounted display) so the pilot can guide the aircraft to stay within the spatiotemporal region. For example, the perimeter is displayed as a transparent boundary or mesh boundary in an overlay of the environment. In some cases, the assignment includes control instructions that control the aircraft to enter a perimeter and stay within it during the duration of the spatiotemporal region, resulting in the aircraft tracking with the spatiotemporal region. Said differently, assignment module 250 may control the aircraft so it complies with the constraints of the spatiotemporal region. In some embodiments, the action module 270 controls the aircraft.

In some embodiments, an aircraft requests a spatiotemporal region. This process may include the controller 110 receiving an assignment request from an aircraft (e.g., that includes a unique identifier of the aircraft), authenticating the aircraft, recording the assignment, and providing a token to the aircraft. Assignment requests can include: a monetary purchase of access to a spatiotemporal region, a request by an aerial service provider operating a fleet of aircraft within the aerial network, or a communication from the aircraft.

After receiving an assignment request for an aircraft, the controller 110 can optionally authenticate the aircraft, which functions to confirm the aircraft is authorized to operate within the aerial network (and is registered within the aerial network). Additionally, or alternatively, authenticating the aircraft can function to confirm the aircraft can meet the requirements or restrictions of the spatiotemporal region requested for assignment (e.g., aircraft type, flightpath rate, deviation from the flightpath rate, turn radius, aircraft weight, noise requirements, appropriate priority status).

The assignment request may be recorded. This establishes an auditable record of the aircraft in conjunction with the assigned spatiotemporal region. The recorded assignment may include a spatiotemporal region ID in conjunction with the unique aircraft identifier. After recordation, the controller 110 may provide a token to the aircraft. This may establish takeoff authorization and landing authorization for the aircraft within the spatiotemporal region. Additionally, or alternatively, the token can function as a security layer to establish the identity of the aircraft. The token may be pre-generated or generated upon recording the assignment to the aircraft. The token may be unique to the spatiotemporal region (e.g., globally unique or temporally unique). In conjunction with providing the token to the aircraft, a token reference (e.g., the token itself, a token identifier, or an encryption key) may be stored in conjunction with the spatiotemporal region. This may be used subsequently authenticate the aircraft's token.

Among other advantages, the token process may be simple process that avoids complications and processing delays. Because a spatiotemporal region may be predefined, the token may simply grant (or deny) access to a spatiotemporal region e.g., without needing to establish a data link to conduct a long clearance process.

In some cases, a controller failure may occur. In these circumstances, each aircraft may be instructed (or was previously instructed) to continue traveling according to the previously assigned spatiotemporal regions. After a controller failure, the controller 110 may re-authenticate each aircraft operating within the network and audit each aircraft according to the (post-failure) position of each aircraft. In absence of aircraft deviation from spatiotemporal regions, this process may occur without rerouting any aircraft airborne during the controller failure.

The monitoring module 260 monitors locations (or positions) of an assigned aircraft as it travels from a departure site to an arrival site. More specifically, the monitoring module 260 monitors the location of the aircraft over time relative to a perimeter of the assigned spatiotemporal region. The monitoring module 260 monitors locations to verify aircraft adherence to the spatiotemporal regions (e.g., verifying that the current aircraft position is within the spatiotemporal region or within the deviation thresholds).

The monitoring module 260 may repeatedly (e.g., continuously or periodically) determine a current earth-referenced position of the aircraft. The position may be determined by receiving position communications from the aircraft. An aircraft can determine a current position based on onboard sensors or external fiducials (e.g., wireless fiducials on the ground or terrain features). The monitoring module 260 may also use data collected by other aircraft within the network (e.g., object detection and avoidance systems onboard another aircraft, or pilot observations or radio communications).

The action module 270 performs actions if an assigned aircraft is found to be (or is expected to by) non-compliant with its assigned spatiotemporal region. The actions performed may depend on the context of the situation. For example, an aircraft departing at slightly different time than scheduled calls for a different action compared to an aircraft that is intentionally deviating from a perimeter.

If the aircraft leaves the perimeter of the spatiotemporal region (e.g., past a deviation threshold), the action module 270 may determine and transmit instructions to direct the aircraft back to the perimeter. In some cases (e.g., if non-compliance may lead to potential danger), an aircraft may be re-routed out of the network, directed into a predetermined hold pattern (e.g., away from the spatiotemporal regions), directed to an auxiliary landing site (e.g., outside of the network), or removed from the network (e.g., access to the airspace of the spatiotemporal region is revoked, token authorization/clearances revoked, or spatiotemporal region assignment vacated).

In some embodiments, the action module 270 adjusts parameters of the spatiotemporal region so that an aircraft is within (or stays within) the spatiotemporal region. For example, the action module 270 adjusts the spatiotemporal region departure time based on when the aircraft takes off. In another example, the flightpath rate is decreased if the aircraft is flying slower than expected (and thus potentially leaving the perimeter). In another example, a flightpath is adjusted if the airplane begins to deviate from the flightpath.

In some cases, the action module 270 assigns the aircraft to another (previously generated) spatiotemporal region so the aircraft is within a perimeter of the reassigned spatiotemporal region. For example, if a storm forces a pilot to leave a perimeter, the action module 270 may assign the aircraft to a nearby unassigned or vacant spatiotemporal region with a flightpath that avoids the location of the storm. Reassigning spatiotemporal regions is further described with respect to FIG. 6.

In some cases, the action module 270 generates a new spatiotemporal region so the aircraft is within a perimeter of the new spatiotemporal region. The action module 270 may perform this action if it is not appropriate or helpful to modify the parameters of the currently assigned spatiotemporal region or reassign the aircraft to a previously generated spatiotemporal regions (e.g., special or unpredictable circumstances).

Figure 6:
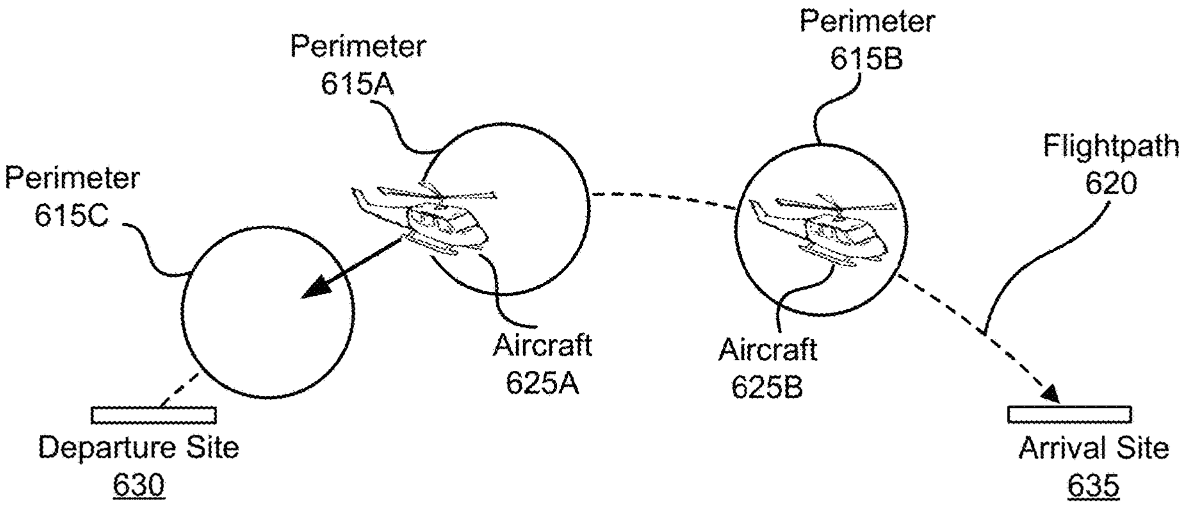
FIG. 6 illustrates an example of an aircraft transitioning between spatiotemporal regions according to one or more embodiments.

FIG. 6 illustrates an aircraft 625A transitioning from one spatiotemporal region to a different spatiotemporal region, according to one or more embodiments. Specifically, FIG. 6 illustrates three perimeters 615A-615C (each associated with a different spatiotemporal region) that travel along the same flightpath 620 from departure site 630 to arrival site 635. The perimeters 615A-C are spaced apart from one another. Aircraft 625B is assigned to perimeter 615B. Aircraft 625A was previously assigned to perimeter 615A, and perimeter 615C was previously unassigned. However, FIG. 6 illustrates aircraft leaving perimeter 615A and traveling toward perimeter 615C. This may be responsive to the action module 270 reassigning aircraft 625A to perimeter 615C. After the transition, perimeter 615A may become unassigned or may remain assigned to aircraft 625A.

In some embodiments, perimeter 615A and perimeter 615C are both assigned to aircraft 625A. This may allow aircraft 625A to move freely within perimeters 615A and 615C and in the intervening space between the perimeters. This may allow aircraft 625A to travel faster or slower than the flightpath rates of perimeters 615A and 615C (at least during a transition period).

Example Method for Controlling Aircraft Traffic

Figure 7:
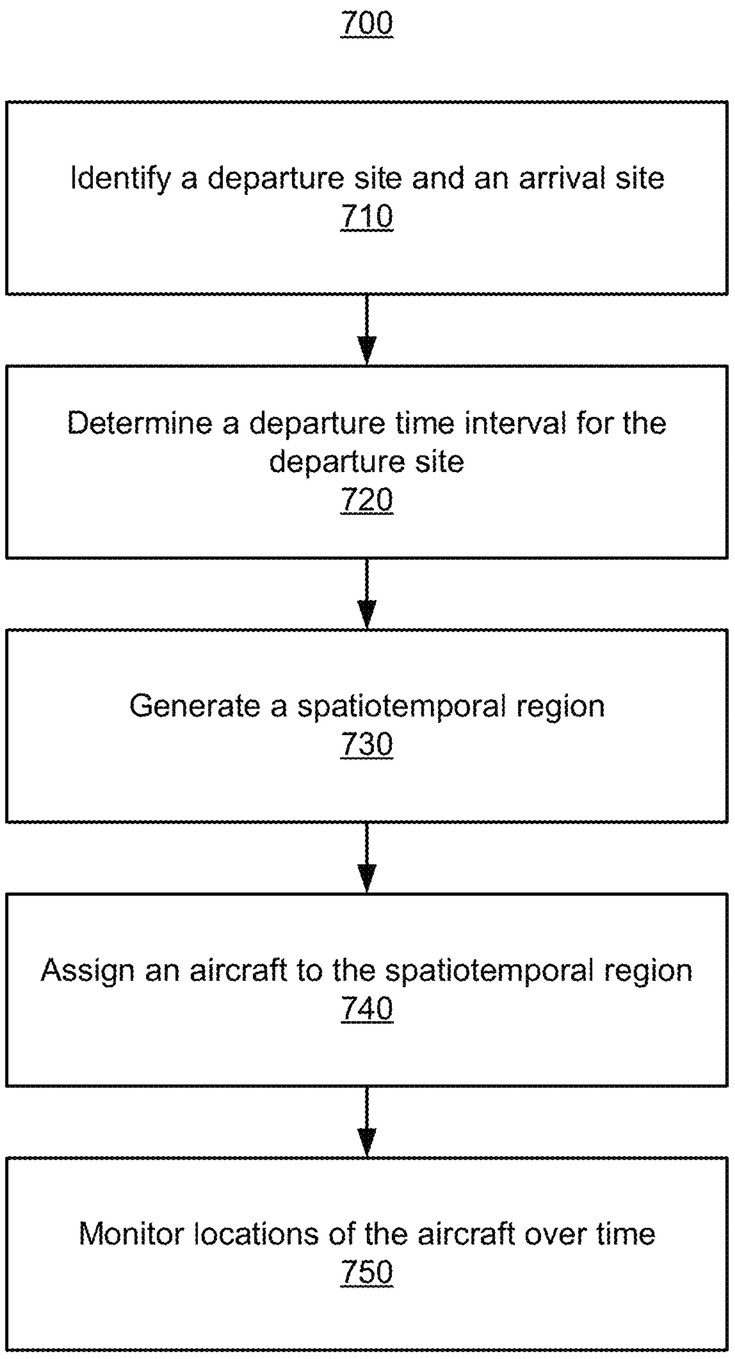
FIG. 7 is a flow diagram illustrating an example of a process for controlling aircraft traffic in an aerial network according to one or more embodiments.

FIG. 7 is a flow diagram illustrating one example embodiment of a process 700 for controlling aircraft traffic in an aerial network, according to one or more embodiments. In the example embodiment shown, the steps of the method are performed by a controller system (e.g., controller system 110). However, Some or all of the steps may be performed by other entities or components. In addition, some embodiments may perform the steps in parallel, perform the steps in different orders, or perform different steps. Furthermore, the controller system may be integrated with one or more computer systems, such as the computer system 800 described below with reference to FIG. 8.

The controller system identifies 710 a departure site and an arrival site. A departure site is a landing site that an aircraft is expected to use to takeoff. An arrival site is a landing site 130 that an aircraft is expected to use to land. The sites may be used by the controller system to generate a spatiotemporal region (e.g., via steps 720 and 730). The departure site and arrival site may be identified based on their locations, destinations near the landing sites, current travel demand from the departure site to the arrival site, predicted demand for a later point in time from the departure site to the arrival site, or the number of aircraft that have previously traveled from the departure site to the arrival site (e.g., based on historical flight records).

The controller system determines 720 a departure time interval for the departure site. A departure time interval specifies a time period for an aircraft to occupy the departure site (e.g., to takeoff). The time interval may be long enough for an aircraft to takeoff from the departure site during the time interval. The time interval may also include buffer time to account for possible delays. The departure time interval may be specific to the departure site. For example, due to local weather conditions or the layout, aircraft may need a threshold amount of time to use the departure site to takeoff. Other factors that may affect the departure time interval include an aircraft type of an aircraft expected to use the departure site during the time interval, time of day, time of year, historical data, a set of flightpaths within the aerial network leading to and from the departure site, relative demand, type of cargo (e.g., human passengers or delivery parcels), or an arrival and departure schedule for the departure site.

The controller system generates 730 a spatiotemporal region based on the departure site, the arrival site, and the departure time interval. The spatiotemporal region defines a three-dimensional perimeter that moves in time along a flightpath from the departure site to the arrival site. The perimeter may enclose a volume large enough to contain an aircraft. Parameters of the spatiotemporal region, such as the size and shape of the perimeter and a flightpath rate of the perimeter may be determined based on a type of aircraft that is expected to be (e.g., within a threshold likelihood) assigned to the spatiotemporal region.

The controller system assigns 740 an aircraft to the spatiotemporal region. The assignment may authorize the aircraft to operate within a spatiotemporal region. The assignment includes instructions for the aircraft to remain within the perimeter of the spatiotemporal region as the aircraft travels from the departure site to the arrival site. The aircraft may be selected for assignment because it can meet the requirements of the spatiotemporal region (e.g., it can reach the departure site by the departure time interval and traverse the flightpath to the arrival site).

The controller system monitors 750 locations (or positions) of the aircraft over time relative to the perimeter of the spatiotemporal region. The controller system monitors locations to verify aircraft adherence to the spatiotemporal regions (e.g., verifying that the current aircraft position is within the spatiotemporal region or within the deviation thresholds). The controller system may repeatedly (e.g., continuously or periodically) determine a current earth-referenced position of the aircraft. The position may be determined by receiving position communications from the aircraft.

In some embodiments, the controller system determines the aircraft vehicle is a threshold distance outside of the perimeter of the spatiotemporal region and transmits instructions to the aircraft to return to the perimeter of the spatiotemporal region. Additional to, or alternative to, transmitting the instructions, the controller system may perform at least one of: modifying the spatiotemporal region so the aircraft is within the spatiotemporal region; assigning the aircraft to another spatiotemporal region (e.g., previously generated) so the aircraft is within perimeter of the other spatiotemporal region; or generating a new spatiotemporal region so the aircraft is within a perimeter of the new spatiotemporal region.

In some embodiments, after assigning the aircraft to the spatiotemporal region, the controller system modifies the spatiotemporal region based on the aircraft. For example, the controller system modifies a size of the perimeter based on the assigned aircraft, modifies a shape of the perimeter based on the assigned aircraft, modifies the flightpath based on the assigned aircraft, or modifies a flightpath rate of the perimeter along the flightpath based on the assigned aircraft.

In some embodiments, the controller system determines a set of departure time intervals different than the departure time interval (e.g., different start time, end time, or total time), generates a set of spatiotemporal regions based on the departure site, the arrival site, and the set of departure time intervals. Each spatiotemporal region of the set defines a three-dimensional perimeter that moves in time along the flightpath from the departure site to the arrival site. The controller system may then assign a set of aircraft (not including the previously mentioned aircraft) to the set of spatiotemporal regions. In some embodiments, a threshold percentage or number of spatiotemporal regions of the set do not receive aircraft assignments. This may provide extra network flexibility (e.g., in case of delays, in case an aircraft needs to be reassigned to a different spatiotemporal region, or in case a new aircraft enters the aerial network and needs to be assigned a spatiotemporal region).

Computing Machine Architecture

Figure 8:
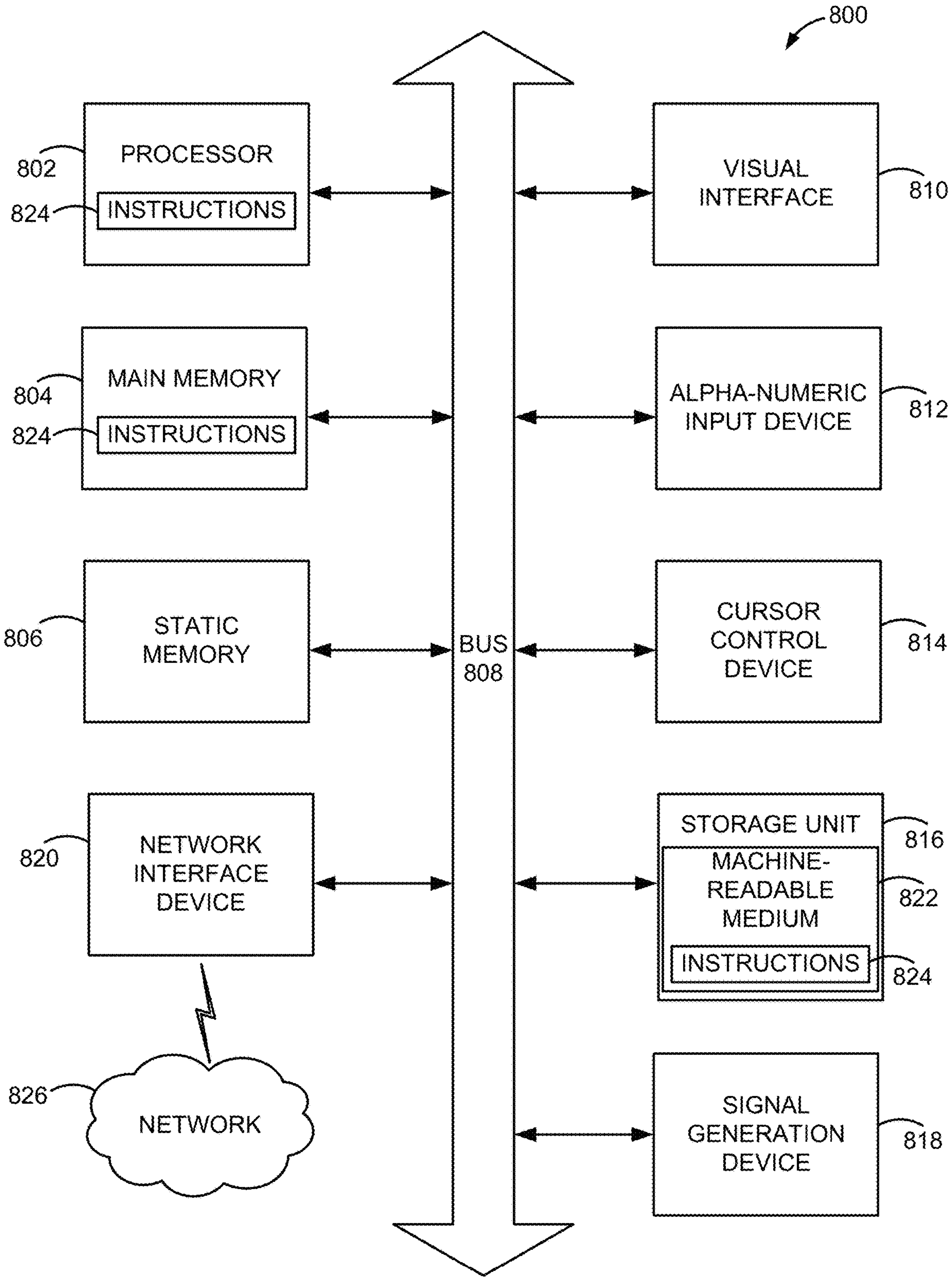
FIG. 8 is a block diagram illustrating components of an example machine able to read instructions from a machine-readable medium and execute them in a processor (or controller) according to one or more embodiments.

FIG. 8 is a block diagram illustrating one embodiment of components of an example machine (e.g., controller system 110) able to read instructions from a machine-readable medium and execute them (e.g., in a processor or controller), according to one or more embodiments. Specifically, FIG. 8 shows a diagrammatic representation of a machine in the example form of a computer system 800 within which program code (e.g., software) for causing the machine to perform any one or more of the methodologies discussed herein may be executed. The computer system 800 may be used for one or more components of the aerial network 100 depicted and described throughout this disclosure (e.g., the controller system 110). The program code may be comprised of instructions 824 executable by one or more processors 802. In alternative embodiments, the machine operates as a standalone device or may be connected (e.g., networked) to other machines. In a networked deployment, the machine may operate in the capacity of a server machine or a client machine in a server-client network environment, or as a peer machine in a peer-to-peer (or distributed) network environment.

The machine may be a computing system capable of executing instructions 824 (sequential or otherwise) that specify actions to be taken by that machine. Further, while only a single machine is illustrated, the term "machine" shall also be taken to include any collection of machines that individually or jointly execute instructions 124 to perform any one or more of the methodologies discussed herein.

The example computer system 800 includes one or more processors 802 (e.g., a central processing unit (CPU), a graphics processing unit (GPU), a digital signal processor (DSP), one or more application specific integrated circuits (ASICs), one or more radio-frequency integrated circuits (RFICs), field programmable gate arrays (FPGAs)), a main memory 804, and a static memory 806, which are configured to communicate with each other via a bus 808. The computer system 800 may further include visual display interface 810. The visual interface may include a software driver that enables (or provide) user interfaces to render on a screen either directly or indirectly. The visual interface 810 may interface with a touch enabled screen. The computer system 800 may also include input devices 812 (e.g., a keyboard a mouse), a storage unit 816, a signal generation device 818 (e.g., a microphone and/or speaker), and a network interface device 820, which also are configured to communicate via the bus 808.

The storage unit 816 includes a machine-readable medium 822 (e.g., magnetic disk or solid-state memory) on which is stored instructions 824 (e.g., software) embodying any one or more of the methodologies or functions described herein. The instructions 824 (e.g., software) may also reside, completely or at least partially, within the main memory 804 or within the processor 802 (e.g., within a processor's cache memory) during execution.

Additional Configuration Considerations

The disclosed configurations beneficially provide for controlling aircraft traffic in an aerial network via spatiotemporal regions. Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium and processor executable) or hardware modules. A hardware module is tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module is a tangible component that may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Some portions of this specification are presented in terms of algorithms or symbolic representations of operations on data stored as bits or binary digital signals within a machine memory (e.g., a computer memory). These algorithms or symbolic representations are examples of techniques used by those of ordinary skill in the data processing arts to convey the substance of their work to others skilled in the art. As used herein, an "algorithm" is a self-consistent sequence of operations or similar processing leading to a desired result. In this context, algorithms and operations involve physical manipulation of physical quantities. Typically, but not necessarily, such quantities may take the form of electrical, magnetic, or optical signals capable of being stored, accessed, transferred, combined, compared, or otherwise manipulated by a machine. It is convenient at times, principally for reasons of common usage, to refer to such signals using words such as "data," "content," "bits," "values," "elements," "symbols," "characters," "terms," "numbers," "numerals," or the like. These words, however, are merely convenient labels and are to be associated with appropriate physical quantities.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for universal vehicle control through the disclosed principles herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

What is claimed is:

1. A method comprising:

identifying a departure site and an arrival site;

determining a departure time interval for the departure site;

generating a spatiotemporal region based on the departure site, the arrival site, and the departure time interval, the spatiotemporal region defining a three-dimensional perimeter that moves in time along a flightpath from the departure site to the arrival site;

assigning an aircraft to the spatiotemporal region, the assignment including first instructions for the aircraft to remain within the perimeter of the spatiotemporal region as the aircraft travels from the departure site to the arrival site, wherein the aircraft is controlled according to the first instructions; and monitoring locations of the aircraft over time relative to the perimeter of the spatiotemporal region.

2. The method of claim 1, further comprising:

determining the aircraft is a threshold distance outside of the perimeter of the spatiotemporal region; and transmitting second instructions to the aircraft to return to the perimeter of the spatiotemporal region.

3. The method of claim 1, further comprising:

determining the aircraft is a threshold distance outside of the perimeter of the spatiotemporal region; and at least one of:

modifying the spatiotemporal region so the aircraft is within the spatiotemporal region;

assigning the aircraft to a second spatiotemporal region so the aircraft is within a second perimeter of the second spatiotemporal region; or generating a third spatiotemporal region so the aircraft is within a third perimeter of the third spatiotemporal region.

4. The method of claim 1, further comprising: subsequent to assigning the aircraft to the spatiotemporal region, modifying the spatiotemporal region based on the aircraft.

5. The method of claim 4, wherein modifying the spatiotemporal region comprises at least one of:

modifying a size of the perimeter based on the assigned aircraft;

modifying a shape of the perimeter based on the assigned aircraft;

modifying the flightpath based on the assigned aircraft; or modifying a flightpath rate of the perimeter along the flightpath based on the assigned aircraft.

6. The method of claim 1, wherein a size and shape of the perimeter is based on a type of aircraft that will be assigned to the spatiotemporal region.

7. The method of claim 1, further comprising:

determining a set of departure time intervals different than the departure time interval; and generating a set of spatiotemporal regions based on the departure site, the arrival site, and the set of departure time intervals, each spatiotemporal region of the set of spatiotemporal regions defining a three-dimensional perimeter that moves in time along the flightpath from the departure site to the arrival site.

8. The method of claim 7, further comprising: assigning a set of aircraft not including the aircraft to the set of spatiotemporal regions.

9. The method of claim 8, wherein a threshold percentage or number of spatiotemporal regions of the set of spatiotemporal regions do not receive aircraft assignments.

10. The method of claim 1, further comprising: subsequent to assigning the aircraft to the spatiotemporal region, at least one of:

deleting a second spatiotemporal region that conflicts with the spatiotemporal region; or modifying a third spatiotemporal region that conflicts with the spatiotemporal region.

11. A non-transitory computer-readable storage medium comprising stored first instructions, the first instructions, when executed by a computer system, cause the computer system to perform operations including:

identifying a departure site and an arrival site;

determining a departure time interval for the departure site;

generating a spatiotemporal region based on the departure site, the arrival site, and the departure time interval, the spatiotemporal region defining a three-dimensional perimeter that moves in time along a flightpath from the departure site to the arrival site;

assigning an aircraft to the spatiotemporal region, the assignment including second instructions for the aircraft to remain within the perimeter of the spatiotemporal region as the aircraft travels from the departure site to the arrival site, wherein the aircraft is controlled according to the second instructions; and monitoring locations of the aircraft over time relative to the perimeter of the spatiotemporal region.

12. The non-transitory computer-readable storage medium of claim 11, further comprising:

determining the aircraft is a threshold distance outside of the perimeter of the spatiotemporal region; and transmitting third instructions to the aircraft to return to the perimeter of the spatiotemporal region.

13. The non-transitory computer-readable storage medium of claim 11, further comprising:

determining the aircraft is a threshold distance outside of the perimeter of the spatiotemporal region; and at least one of:

modifying the spatiotemporal region so the aircraft is within the spatiotemporal region;

assigning the aircraft to a second spatiotemporal region so the aircraft is within a second perimeter of the second spatiotemporal region; or generating a third spatiotemporal region so the aircraft is within a third perimeter of the third spatiotemporal region.

14. The non-transitory computer-readable storage medium of claim 11, further comprising: subsequent to assigning the aircraft to the spatiotemporal region, modifying the spatiotemporal region based on the aircraft.

15. The non-transitory computer-readable storage medium of claim 14, wherein modifying the spatiotemporal region comprises at least one of:

modifying a size of the perimeter based on the assigned aircraft;

modifying a shape of the perimeter based on the assigned aircraft;

modifying the flightpath based on the assigned aircraft; or modifying a flightpath rate of the perimeter along the flightpath based on the assigned aircraft.

16. The non-transitory computer-readable storage medium of claim 11, wherein a size and shape of the perimeter is based on a type of aircraft that will be assigned to the spatiotemporal region.

17. The non-transitory computer-readable storage medium of claim 11, further comprising:

determining a set of departure time intervals different than the departure time interval; and generating a set of spatiotemporal regions based on the departure site, the arrival site, and the set of departure time intervals, each spatiotemporal region of the set of spatiotemporal regions defining a three-dimensional perimeter that moves in time along the flightpath from the departure site to the arrival site.

18. The non-transitory computer-readable storage medium of claim 17, further comprising: assigning a set of aircraft not including the aircraft to the set of spatiotemporal regions.

19. The non-transitory computer-readable storage medium of claim 18, wherein a threshold percentage or number of spatiotemporal regions of the set of spatiotemporal regions do not receive aircraft assignments.

20. A system comprising:

a computer system; and a computer-readable storage medium comprising stored first instructions, the first instructions, when executed by the computer system, cause the computer system to perform operations including:

identifying a departure site and an arrival site;

determining a departure time interval for the departure site;

generating a spatiotemporal region based on the departure site, the arrival site, and the departure time interval, the spatiotemporal region defining a three-dimensional perimeter that moves in time along a flightpath from the departure site to the arrival site;

assigning an aircraft to the spatiotemporal region, the assignment including second instructions for the aircraft to remain within the perimeter of the spatiotemporal region as the aircraft travels from the departure site to the arrival site, wherein the aircraft is controlled according to the second instructions; and monitoring locations of the aircraft over time relative to the perimeter of the spatiotemporal region.

* * * * *